United States Patent
Milner

[11] 3,898,027
[45] Aug. 5, 1975

[54] HEAT EXCHANGE MOLDING SYSTEM

[76] Inventor: Sanford N. Milner, Rt. No. 1, River View, Ala. 36872

[22] Filed: May 21, 1973

[21] Appl. No.: 362,181

Related U.S. Application Data

[63] Continuation of Ser. No. 113,275, Feb. 8, 1971, abandoned, which is a continuation-in-part of Ser. No. 825,740, May 19, 1969, abandoned.

[52] U.S. Cl. ............... 425/256; 425/453; 425/432; 425/DIG. 201
[51] Int. Cl. ............................................ B29c 5/00
[58] Field of Search ............ 425/88, 453, 317, 404, 425/261, 256, DIG. 201; 49/118, 119, 120, 121

[56] References Cited
UNITED STATES PATENTS

| | | | |
|---|---|---|---|
| 2,032,934 | 3/1936 | Horsch | 425/186 |
| 2,112,513 | 3/1938 | Abott, Jr. et al. | 425/93 |
| 2,218,767 | 10/1940 | Pfeifer | 425/432 |
| 2,383,736 | 8/1945 | Rembart et al. | 264/37 |
| 2,713,935 | 7/1955 | Bishop | 425/453 X |
| 2,905,463 | 9/1959 | Borden | 49/118 X |
| 2,939,450 | 6/1960 | Rubens | 49/121 X |
| 3,306,835 | 8/1967 | Magnus | 425/110 |
| 3,384,939 | 5/1968 | Baker | 425/111 |
| 3,506,755 | 4/1970 | Rudder et al. | 425/160 X |

Primary Examiner—Francis S. Husar
Assistant Examiner—David S. Safran

[57] ABSTRACT

A heat exchange system and process for converting particles of the flowable material into an object having a predetermined shape; the system including mold means defining a cavity area representative of the predetermined shape, means for charging the mold cavity area, oven heating means for heating the charged mold to a predetermined temperature sufficient to melt the particles of flowable material whereby the particles will unite to form the predetermined shaped object, means for transferring the filled mold into and out of the oven heating means and means for cooling the mold containing the formed object in an amount sufficient to allow the formed object to be removed from the mold. The mold charging means includes a hopper supply means for introducing a predetermined amount of flowable material into the mold means. Conveyor means is provided for moving the charged mold through the oven heating means, transferring the heated mold from the oven heating means to the cooling means and thereafter transferring the heated mold through various cooling stations. The apparatus includes automatic control means for effecting operation of the mold charging means, oven heating means, conveyor means and cooling station means, respectively.

2 Claims, 14 Drawing Figures

PATENTED AUG 5 1975

3,898,027

SHEET 1

INVENTOR.
SANFORD N. MILNER

BY: Newton, Hopkins, & Ormsby
ATTORNEYS

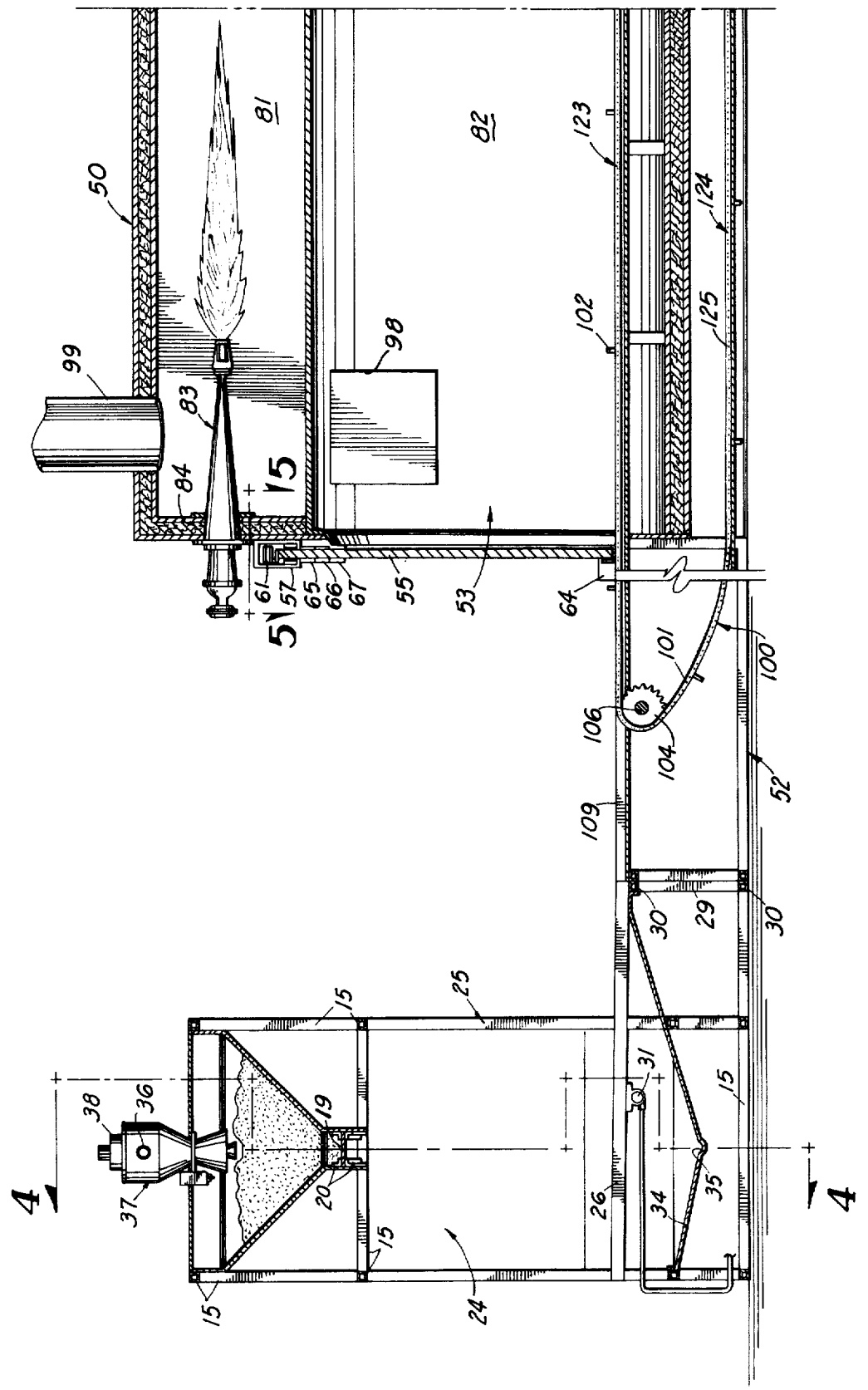

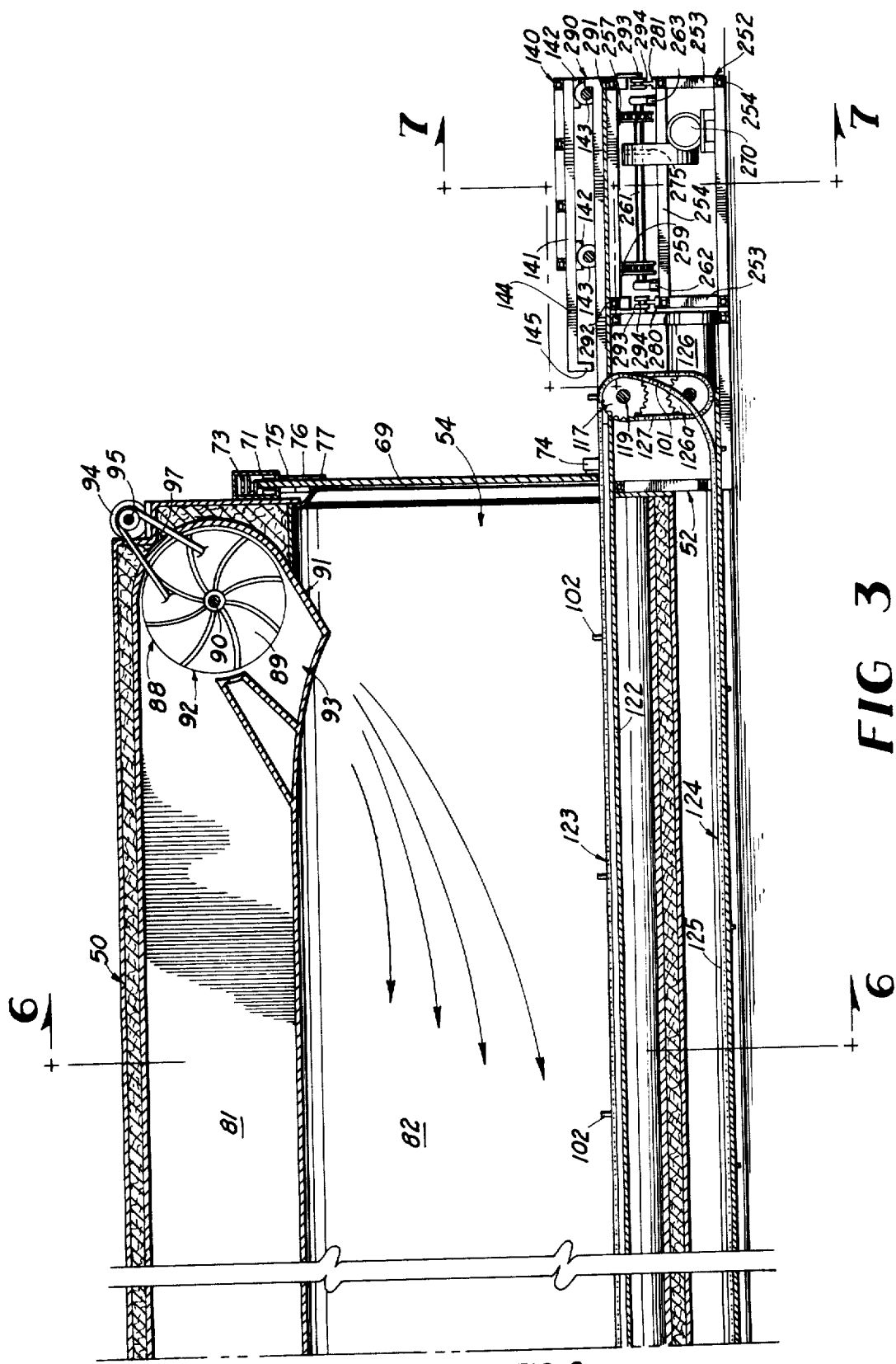

HEAT EXCHANGE MOLDING SYSTEM

CROSS-REFERENCE TO RELATED APPLICATIONS

This application is a continuation of Ser. No. 113,275 filed Feb. 8, 1971, for THE HEAT EXCHANGE SYSTEM AND PROCESS OF CASTING, which in turn was a continuation-in-part of application Ser. No. 825,740 filed May 19, 1969, for a METHOD AND APPARATUS FOR HEAT TREATING PLASTIC, both earlier applications which are now abandoned.

BACKGROUND OF THE INVENTION

This invention relates to a system including automatic control means capable of effecting the complete casting operation including charging the mold, heating the mold, transferring the mold and cooling the mold to allow the formed object to be removed. More particularly, this invention includes a closed mold casting apparatus capable of containing a predetermined quantity of flowable plastic material and for effectively casting the flowable plastic material into a predetermined shaped object.

During the past few years a great deal of consideration has been given to the process of forming plastic parts by using a closed mold or cavity. This process consists of four individual steps, loading of raw material, molding or casting, cooling or curing and unloading of finished articles. Enthusiasm for this process continues to run high, and continued growth of the process seems assured during the foreseeable future because of its strong points: ability to mold large or unusual configurations; and relative freedom of part design. Barring a few limitations, there is practically no shape or size that cannot be molded by this process. Generally speaking, the more complex the end product configuration, or the larger its size, the more suitable is this process for producing it.

In comparison with other plastic processing methods, machinery for closed mold casting of plastic is inexpensive relative to the size object which can be produced.

The machinery presently being used does not obtain the degree of sophistication enjoyed by some of the other plastic molding processes. In the past, the movement of raw material through the molding step, to the cooling step and through the cooling means has been in a stop-and-go stage of operation primarily by manual means. Greater automation has yet to be obtained in producing a continuous system of closed mold plastic casting initiated by a stop button followed by an entire, fully automatic cycle of operation.

SUMMARY OF THE INVENTION

The disadvantages of the prior art have been overcome by the present invention which basically includes a mold formed to include a cavity area representative of a predetermined object to be molded. The mold is successively and automatically moved to a number of operating stations provided in the system. A first station includes a mold charging station having a hopper feed supply means for introducing a predetermined quantity of flowable material into the cavity area of the mold. Conveyor means is operatively associated with the mold charging station for transferring the charged mold to a heating oven wherein the mold is allowed to remain for a predetermined period of time and wherein the temperature in the oven is detailed to effect heating of the mold sufficient to melt the particles of flowable material causing them to unite into the shape of the predetermined object.

The conveyor means utilized for transferring the charged mold into the oven will be automatically energized after the mold has remained in the oven for a required amount of time for moving the heat mold through an exit opening provided in the oven. Conveyor transfer means is operatively associated with the oven heating conveyor means for effecting a transfer of the heated mold from a first location adjacent an exit end of the oven conveyor to a second location adjacent an entrance end of a cooling station conveyor means.

The transfer conveyor means includes automatically operable means which will effect an operation of the transfer conveyor in response to movement of the heated mold to the first location by the oven conveyor means. Movement of the heated mold to the second location of the transfer conveyor will effect cycle of operation of the cooling station conveyor means whereby the heated mold will be transferred successfully to a number of cooling stations and thereafter to a location remote of the cooling station.

An important feature of the present invention resides in the provision of automatic control means for effectively moving a filled mold through a number of processing stations whereby an amount of flowable material can be converted into an object having a predetermined shape.

It is therefore a primary object of this invention to provide a process system for the casting of flowable plastic raw material which is really automatic in its operation.

A further object of this invention is to provide a plastic casting process containing a heating station and a cooling station with automatic movement of material through the heating station and cooling station.

A still further object of this invention is to provide a plastic casting process having two stages of cooling in the cooling process.

Still another object of this invention is to provide a plastic casting process utilizing a continuous automatically controlled transfer means for effecting movement of raw material into, through, and out of a heating means; from the heating means to a cooling means; and into, through, and out of the cooling means.

An additional object of this invention is to provide a plastic casting process having a transfer means yieldable in its operation.

A further object of this invention is to provide a plastic casting process having a heating station, heating means, and cooling station, cooling means with automatic control means for effecting operation of the heating and cooling means.

A still further object of this invention is to provide an elongated heating oven automatic in operation, for use in a plastic casting process including heating means and material transfer means.

Another object of this invention is to provide a heating means, transfer means, and conveyor means which causes the raw plastic to be heated to a melting temperature in a controlled manner.

A further object of this invention is to provide means for controlled cooling of the cast plastic, using circulated air currents and direct coolant spray means.

Still another object of this invention is to provide an elongated cooling apparatus automatic in its operation for use in a plastic casting process including cooling means and material transfer means.

A further object of this invention is to provide a mold charging apparatus having automatically operable hopper means for introducing a predetermined quantity of flowable plastic material into a mold cavity area.

Another object of this invention is to provide a mold charging station wherein means is provided for catching and retaining overflow material from a mold being charged and for returning the overflow material to a supply hopper means.

Still another object of this invention is to provide an improved heating chamber means wherein means is provided for effecting a continuous circulation of heated air within the heating chamber.

A still further object of this invention is to provide a reciprocally operable conveyor means which is moved through a first portion of reciprocating cycle of operation in response to movement of a mold support means to a first location and is returned through a second portion of the cycle of operation in response to movement of the mold support means to the second location.

Yet another object of this invention is to provide a conveyor and dolley supporting arrangement which will effectively transfer a mold supporting dolley from a first conveyor onto a second conveyor and will thereafter transfer the mold from the second conveyor to a third conveyor.

An additional object of this invention is to provide a process system for casting plastic which is simple in construction and operation, economical to manufacture and reliable in performance.

These, together with other objects and advantages of the details of construction, will become apparent upon reading the accompanying description of the illustrative embodiments, with reference to the attached drawings wherein like reference numerals have been used to refer to like parts throughout the several figures, and wherein:

BRIEF DESCRIPTION OF THE DRAWINGS

FIGS. 2 and 3 are vertical sectional views connectible along the matched lines indicated thereon and taken longitudinally through the mold charging station, oven heating means and transversely through a portion of the transfer conveyor means;

DESCRIPTION OF THE ILLUSTRATIVE EMBODIMENTS

Figure 1:
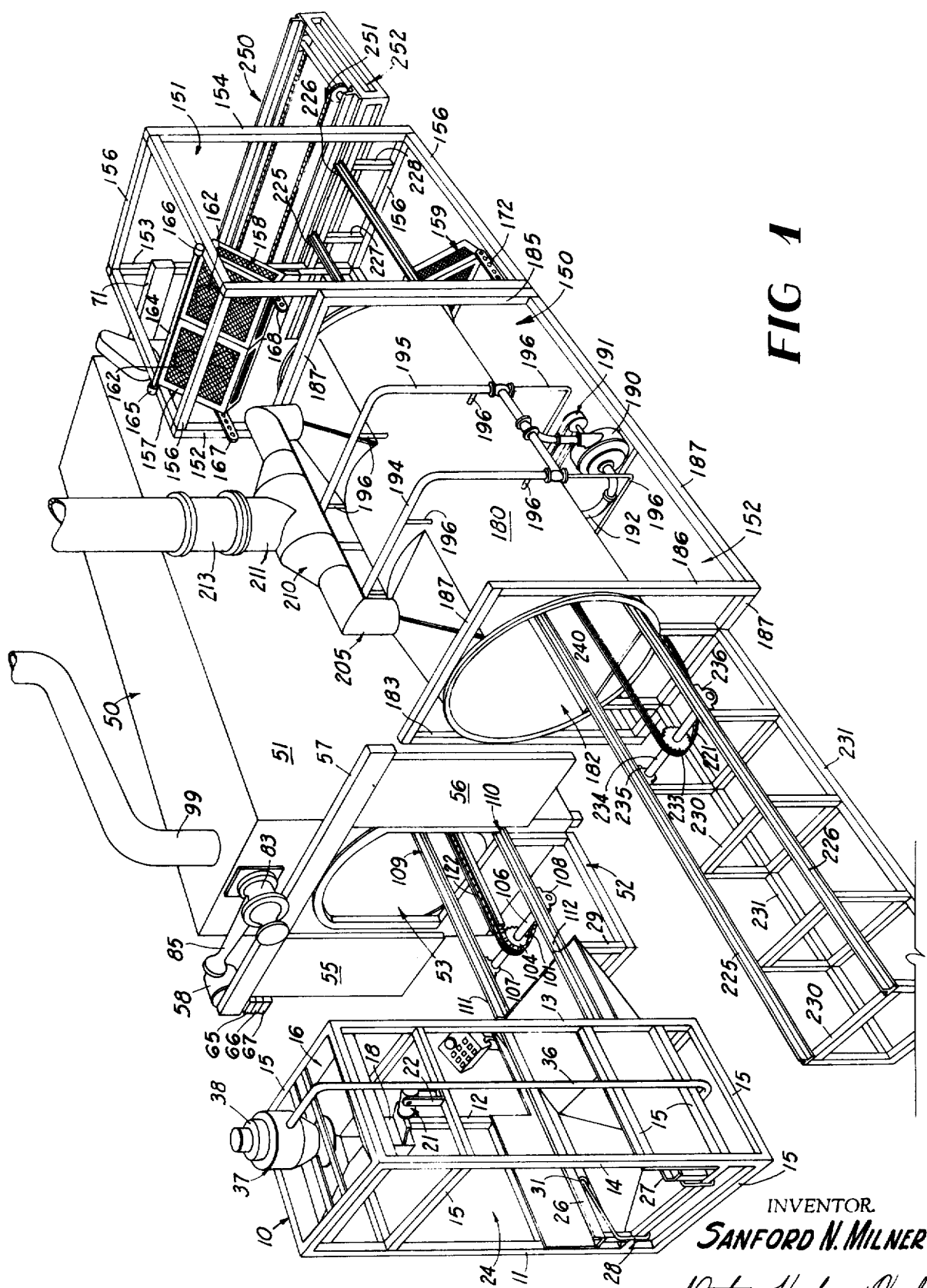
FIG. 1 is a perspective view showing the combination of mold charging station, heating oven means, cooling means and conveyor means for effecting movement of a mold therethrough.

Referring now particularly to the drawings, the illustrative embodiments will be described with reference to a mold charging station 10; a mold heating station 50, including operable conveyor means 100; mold cooling stations 151, 152 including operable conveyor means 220, a mold transfer conveyor means 250 and control means 300.

The function of the mold charging station 10 is to effectively fill the cavity areas of a mold located at a charging position therein.

The function of the mold heating station 50 is to heat a mold located therein to a temperature sufficient to melt flowable material contained within the mold cavities to cause the particles to unite to form the shape of a predetermined object.

The function of the conveyor means 100 in the heating station is to effect a transfer of a charge mold through the entrance opening into the heating chamber of the heating oven and to transfer the heated mold out through the exit opening of the heating oven.

The function of the cooling stations 151, 152 is to cool a heated mold a sufficient amount to allow the formed object to be removed from the mold.

The function of the transfer conveyor means 250 is to effect a transfer of a mold from an exit end of the heating ovens conveyor 101 to a position adjacent the entrance end of the cooling station conveyor 221.

The function of the operable conveyor means 220 of the cooling station is to provide a transfer of a heated mold successively through cooling station 151, 152 in order to effectively reduce the temperature of a heated mold an amount sufficient to allow the formed object to be removed from the mold.

Automatic control means 300 including operable power motor means and a number of limit switches operatively associated with various positions and operating mechanisms throughout the system will effect a complete automatic cycle of operation.

The various structural details of each of the above indicated stations will be described in more detail herein below in the description of each of the respective stations. The operational control of the overall system by the automatic control means 300 will be described in the description of the operation.

MOLD CHARGING STATION

Figure 4:
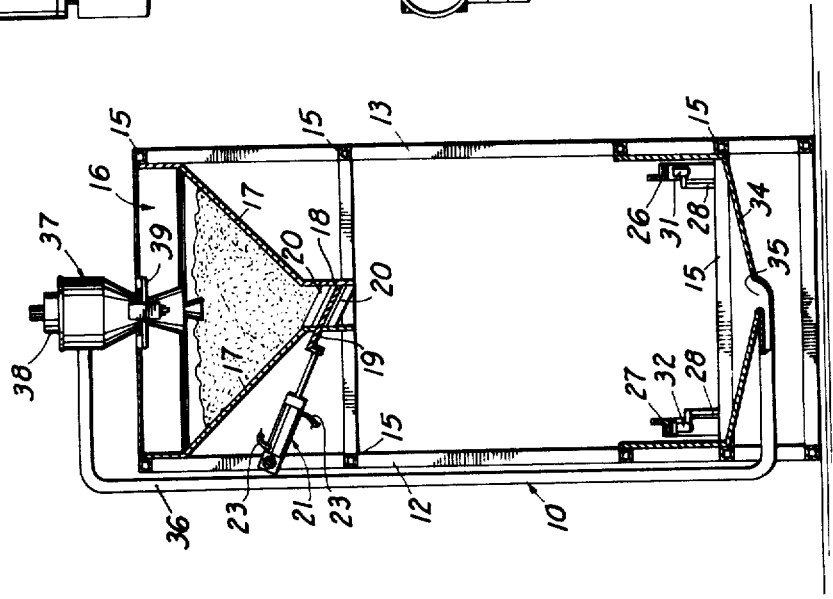
FIG. 4 is a vertical sectional view taken along lines 4—4 of FIG. 2.

Referring now particularly to FIGS. 1, 2 and 4, the mold charging station is represented generally by the reference numeral 10. The mold charging stations include four vertical leg support members 11–14. The leg member 11–14 are supported in a vertically oriented, horizontally spaced, parallel relationship by means of a number of horizontal connector elements 15. A number of horizontal connector elements 15 extend between the bottom edges of each of the vertical leg members and serves as a base support structure for the mold charging station. Additional horizontal connector elements are connected to vertically extended ends of the leg members 11–14 for defining a top surface thereof. Mold charging station 10 is provided with a mold entrance opening 24 as shown on the left of FIGS. 1 and 2 and a mold exit opening 25 as shown on the right of FIGS. 1 and 2. The horizontal connector elements 15 are detailed in location relative to the mold charging entrance opening 24 and exit opening 25 to provide a space sufficient to allow a mold to pass therethrough.

As shown in FIGS. 1, 2 and 4, the mold charging station 10 includes a material supply hopper means 16 supported adjacent an upper extended end of the supporting framework 11–15. The supply hopper 16 defines an upwardly open reservoir means for containing an amount of flowable plastic material which is to be used for charging a mold. The supply hopper 16 includes downwardly converging wall means 17 for directing the material contained therein to a discharge spout 18. Discharge spout 18 defines a flow passageway through which material contained in the supply hopper 16 can be dispensed into the cavity areas of the mold.

A dispensing operation of material from the supply hopper 16 into the mold cavities is controlled by a movable gate 19. Movable gate 19 is supported for a reciprocally operable opening and closure movement by means of a number of guide track means 20. Movement of gate 19 is provided by means of a control cylinder 21. Control cylinder 21 is supported by bracket means 22 adjacent one end. Bracket means 22 are connected to one of the horizontal connector elements 15. An extended end of the cylinder piston rod is connected by conventional means to the movable gate member 19. Supply and exhaust conduit lines 23 are operatively connected to the cylinder 21 and adapted to be connected to conventional pressure pump means (not shown). Movable gate 19 is detailed to be controlled by cylinder 21 for movement from a closed position, as shown in FIG. 4, wherein the material contained within the supply hopper 16 will be prevented from flowing through the discharge spout 18 and operable for moving to an open position which will allow the particles of plastic material to flow through the discharge spout 18 into the mold cavity area. Operational control of the cylinder 21 and movable gate 19 will be described in more detail hereinbelow in the description of the operation of the system.

As shown in FIGS. 1, 2 and 4, the mold charging staion includes a mold dolley track support means having a pair of track elements 26, 27. Tracks 26, 27 are supported in parallel spaced apart relationship in a common horizontal plane. Tracks 26, 27 extend from a position adjacent the mold charging entrance opening 24 to a position extending outwardly of the mold charging exit opening 25, substantially as shown in FIG. 2. The track guide means 26, 27 are supported within the mold charging station 10 by a number of vertical support brackets 28 connected to a number of horizontal connector elements 15. The extended outer end of tracks 26, 27 are supported by a vertically oriented framework 29 and horizontal connector elements 30. The above described track support system is detailed for supporting a mold dolley support means which will be described in more detail hereinbelow and for effecting movement of a mold from a position underneath the mold charging hopper to a position adjacent the entrance of oven heating means.

As shown in FIGS. 2 and 4, each of the tracks 26, 27 inclues a conventional phneumatic vibrating motor means 31, 32, respectively controlled by a manual switch 41 and a time controlled switch 42. Vibrating motors 31, 32 are fixed to tracks 26, 27, respectively beneath an intermediate surface of the track elements. The vibrating motors are operable for effecting a vibration of the track and a mold dolley supported thereon whereby particles of plastic being introduced into the mold cavities will be directed into all portions of the cavity to effect a complete and effective mold charging operation.

An overflow catch basin 33 is supported on the mold charging station 10 beneath tracks 26, 27, as shown in FIGS. 1, 2 and 4. The catch basin 33 is connected to certain of the horizontal connector elements 15 and includes a portion extending outwardly beneath the extended tracks 26, 27, with an extended end being connected to horizontal connector element 30. The dimensions of catch basin 33 is detailed to extend beyond the horizontal dimensions of a mold being charged whereby any particles of plastic material spilled over the sides of the mold will fall into the catch basin.

Catch basin 33 includes downwardly sloping wall surfaces 34 which converge to a suction conduit opening 35. A return conduit means 36 is connected at one end in flow communication with the exhaust opening 35 and is connected at its opposite end to a suction pump means 37. Suction pump 37 is of a conventional construction capable of sucking a supply of plastic particle material in catch basin 33 and for returning the plastic particle material to the supply hoppers 16. Suction pump 37 is provided with a conventional motor 38 controlled by a manual switch 40 and a limit control switch 39. Limit control switch 39 is electrically associated with motor 38 whereby motor 38 can be stopped after the supply of material contained in hopper 16 reaches a predetermined elevation.

In operation, a mold supply dolley is supported on tracks 26, 27 and contains a mold having a cavity area representative of a predetermined shaped object. In a mold charging operation, the mold and support dolley are maneuvered into position beneath the supply hopper discharge spout 18. With the mold located in position beneath discharge spout 18, operational control of cylinder 20 is effected to open moveable gate 19. After gate 19 has moved to an open position, the particles of plastic material contained within supply hopper 16 will flow through the discharge spout 18 and into the cavity areas of the mold. During the mold charging operation, the vibrator motors 31, 32 are energized by conventional switch means (not shown) whereby the mold will be vibrated a sufficient amount to completely and effectively fill all of the cavity areas of the mold.

Should particles of a plastic material spill over the edges of the mold, the spilled material will be retained by the catch basin 33 and fall into suction opening 35 whereby the particles can be returned through return conduit 36 to the supply hopper 16. After a mold has been effectively charged, the mold supporting dolley is transferred from beneath the supply hopper 16 to a position adjacent the heating oven conveyor means whereby the support dolley and mold can be transferred into the heating oven, as will be described in more detail hereinbelow.

MOLD HEATING STATION

Figure 5:
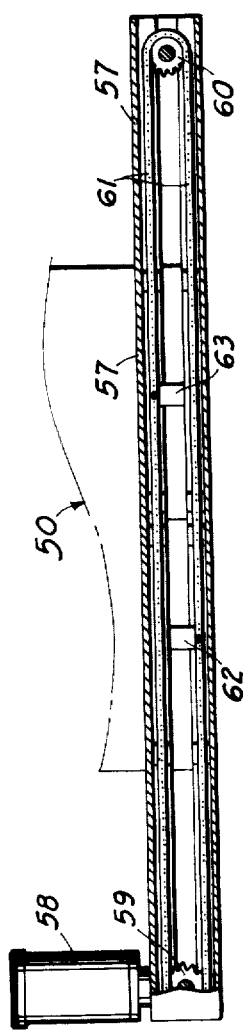
FIG. 5 is a horizontal sectional view taken along lines 5—5 of FIG. 2.
Figure 6:
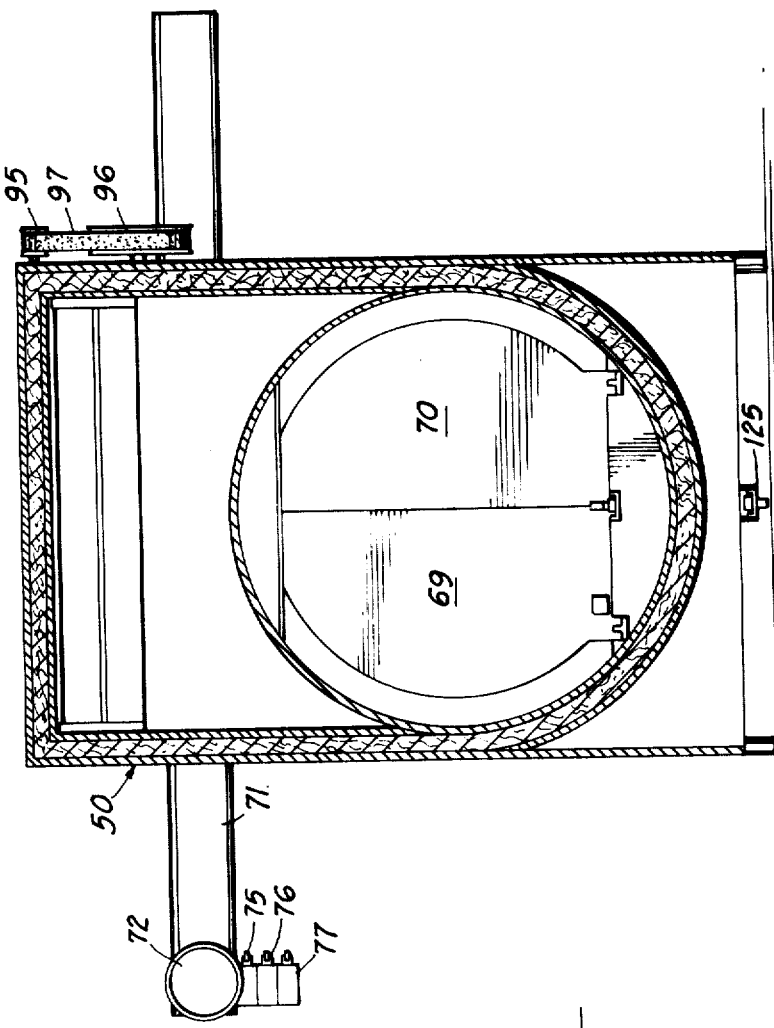
FIG. 6 is a vertical sectional view taken along line 6—6 of FIG. 3.

Referring now to FIGS. 1–3, 5 and 6, the heating oven 50 includes an elongated cylindrical shaped heating chamber 51 supported in a horizontal plane by support framework 52. Heating chamber 51 has an entrance opening 53 on one end and an exit opening 54 on the opposite end. Supported adjacent the entrance opening 53 is a closure means consisting of a pair of horizontally movable doors 55, 56. Doors 55, 56 are supported for horizontal movement between an open and closed position by horizontally oriented guide track means 57 which provides a supporting surface for a number of conventional roller elements attached to doors 55, 56. Movement of doors 55, 56 between an open and closed position is effected by a conventional electric motor means 58 supported on a left end of the guide track 57, as shown in FIGS. 1 and 5. Motor 58 includes a conventional drive shaft means (not shown) operatively connected for driving a sprocket means 59. Sprocket 59 is supported adjacent a left edge of the guide track means 57. A second sprocket 60 is supported for rotation adjacent a right end of the guide track means 57. An endless chain member 61 is supported by and in driving engagement with sprockets 59 and 60 whereby driving motion of sprocket 59 will effect movement of endless chain 61.

Each of the doors 55, 56 include an upstanding bracket element 62, 63, respectively which are connected to an upper edge of the doors and are connected to opposite runs of the chain element 61. The driving connection between chain 61 and bracket 62, 63 are detailed such that movement of chain 61 in a clockwise direction as shown in FIG. 5 will effect a movement of doors 55, 56 to an open position and a reverse movement of the chain in a counterclockwise direction will drive the doors 55, 56 to a closed position.

Operational movement of doors 55, 56 are stopped in a closed limit position by means of a limit switch 64 which will interrupt the drive from motor 58 after the doors have reached the closed limit position. Control of the doors in an open limit position is effected by means of an open limit switch 65. Additional limit switches 66, 67 are operatively associated with the doors 55, 56 to be energized by movement of the doors to an open position for effecting operation of additional control mechanism which will be described in more detail herein below. A manual switch control means 68 is electrically connected with motor 58 whereby doors 55, 56 can be moved between the open and closed position under manual control.

Supported adjacent the exit opening 54 is a pair of doors 69, 70. Doors 69, 70 are supported for movement in a horizontal direction by means of a horizontal oriented guide track means 71. Doors 69, 70 are provided with conventional roller support means for rolling engagement with track 71 whereby doors 69, 70 can be moved between open and closed position in substantially the same manner as described hereinabove in regard to the doors 55, 56. A motor 72 and chain drive means 73 is operatively associated with doors 69, 70 for effecting an opening and closing thereof in the same manner as described hereinbelow in regard to motor 58 and chain 61. Reference is made to the above description of the connection between doors 55, 56 and chain 61 for an understanding of the connection of the chain 73 to door 69, 70. Doors 69, 70 are provided with a first limit switch 74 for indicating movement of the doors to a closed position. A second limit switch 75 is operatively associated with doors 69, 70 for indicating movement of doors 69, 70 to an open position. Additional limit switches 76, 77 are operatively associated with doors 69, 70 for initiating additional control functions of the conveying system and oven heating means, which will be described in more detail hereinbelow. Operation of motor 72 is also controlled by a manual control switch 130 and a timed controlled switch 131 operatively associated with oven conveyor 101.

Figure 13:
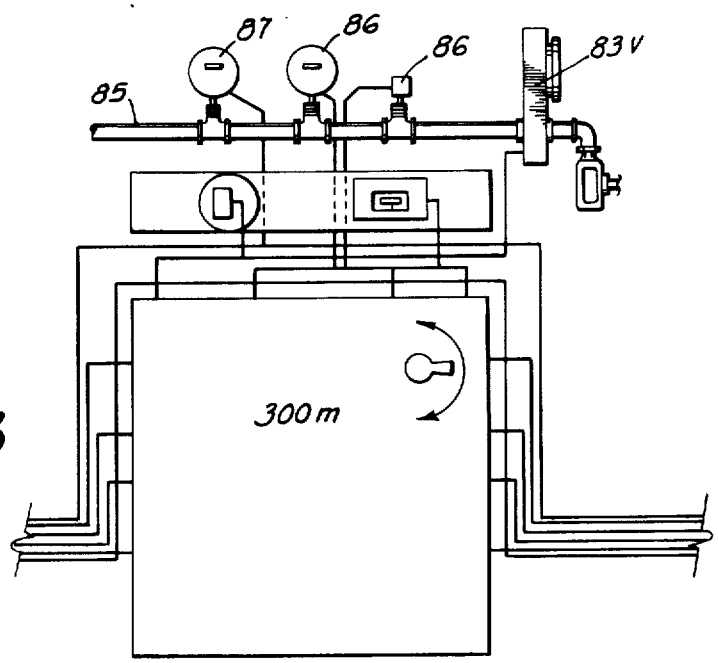
FIG. 13 is a fragmentary vertical plan view taken along lines 13—13 of FIG. 12.
Figure 12:
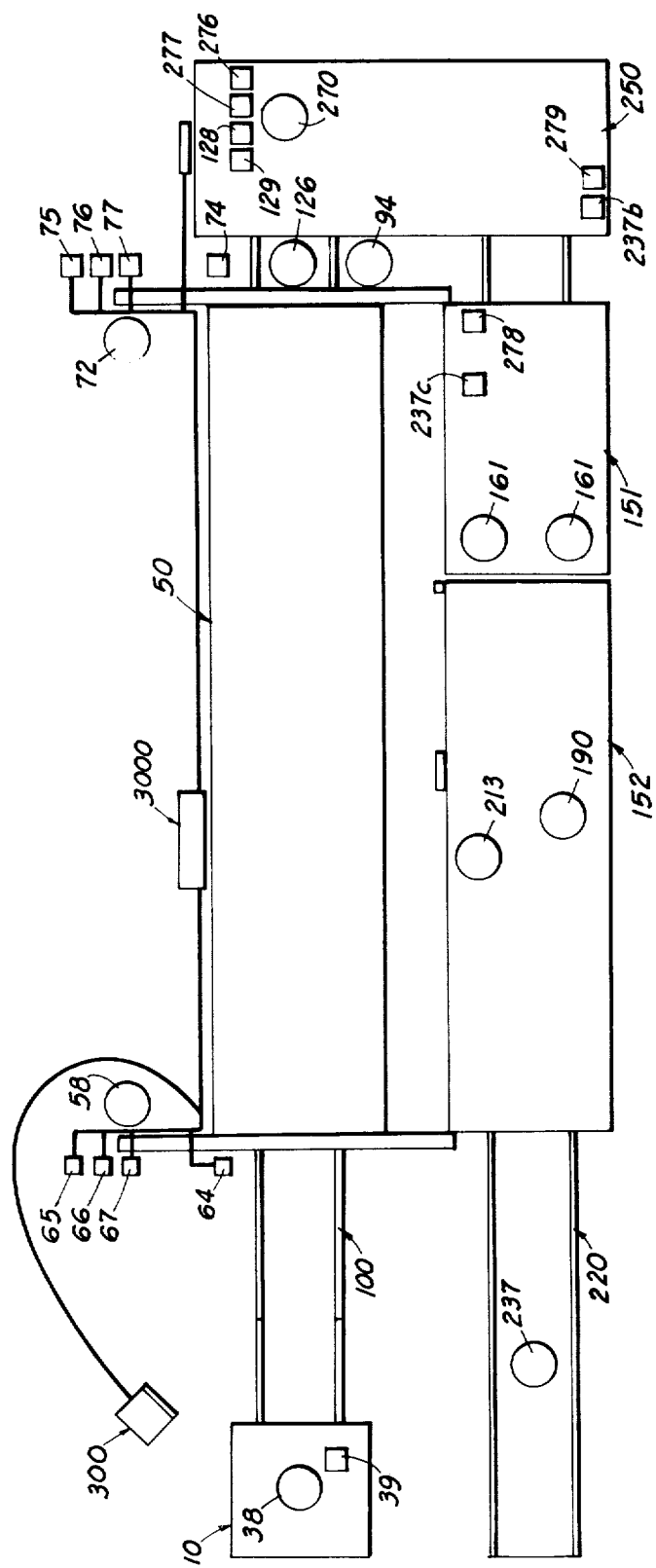
FIG. 12 is a schematic planned view of the apparatus shown in FIG. 1 and including the switch control means therefore.
Figure 14:
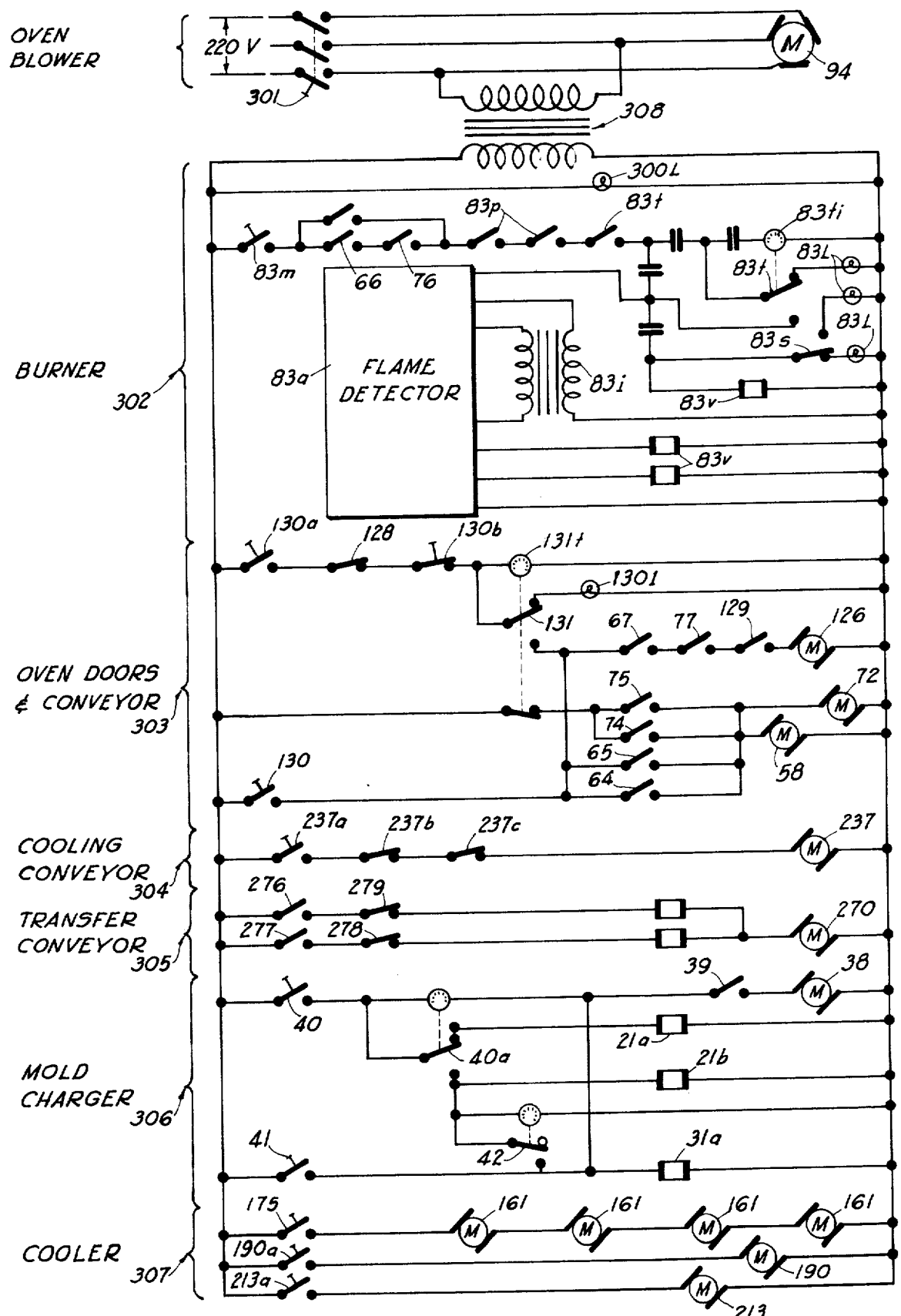
FIG. 14 is an electrical circuit diagram of the electrical control means.

Referring now particularly to FIGS. 2 and 3, the heating oven 50 includes an elongated heating chamber 81 and an elongated burner chamber 82. The air in burner chamber 82 is heated by a conventional gas fire burner nozzle 83 supported in one end wall 84 of burner chamber 82. Operation of burner nozzle 83 is effected by a conventional ignition circuit means 83a from a gas supply line 85 and by a conventional gas pressure control valve 86 and temperature control means 87, as shown in FIGS. 13 and 14. Supported in burner chamber 82 adjacent an end opposite burner nozzle 83 is a conventional squirrel cage blower means 88. Blower 88 includes a fan element 89 rotatably supported by shaft 90 within a blower housing 91. Blower housing 91 includes an entrance opening 92 communicating with the burner chamber 82 and an exit opening 93 communicating with the heating chamber 81. Operation of blower 88 will withdraw heated air from the burner chamber 82 then force the heated air along the length of heating chamber 81.

Operation of blower 88 is effected by a motor 94 supported adjacent heating chamber exit end and controlled by a manual switch means 301. As shown in FIG. 3, motor 94 includes a drive pulley 95. Blower 88 includes a driven pulley (not shown) connected in driving relationship with motor drive pulley 95 by means of a belt 97. A series of openings 98 is provided between heating chamber 81 and burner chamber 82 adjacent the entrance opening or adjacent an end opposite blower means 88, for the purpose of allowing the air in heating chamber 82 to be recirculated through the burner chamber 81 by the blower means 88. Supported above opening 98 and burner nozzle 83 is a burnt gas vent stack means 99.

The burner chamber 81 is located above the heating chamber 82 whereby the heated air within the burner chamber will be drawn through the squirrel cage blower means 88 and directed downwardly into heating chamber 82. The heating air directed into heating chamber 82 will be directed along the length of the mold means within the heating chamber. The heated air within heated chamber will be withdrawn through openings 98 and recirculated in the burner chamber in a manner as described hereinabove. Since the characteristics of heated air is to rise, the location of the burner chamber above the heating chamber will allow a more complete and effective heating operation of the heating chamber.

Referring now particularly to FIGS. 2 and 3, the heating oven 50 includes a mold transfer means consisting of an endless conveyor system 100 having an endless chain 101 supported for operation in a vertical plane and provided with a series of projecting lug elements 102. Endless chain 101 is supported adjacent the heating oven entrance end by a sprocket element 104. Sprocket 104 is rotatably supported by a cross support shaft 106 journaled in a pair of conventional bearing support elements 107, 108. Bearing 107, 108 are mounted on the underside of a pair of transfer tracks 109, 110, respectively.

As shown in FIGS. 1-3, tracks 109, 110 are L-shaped and are supported within heating chamber in a spaced parallel relationship and supported in a common horizontal plane. Tracks 109, 110 adjacent the entrance end extend outwardly a distance sufficient to provide a support platform with the outer extended ends 111, 112 supported in a common plane and aligned with the tracks 26, 27 of the mold charging station 10.

The endless chain 101 is supported adjacent the heating oven exit end by a sprocket element 117. Sprocket 117 is rotatably supported on a cross shaft 119 mounted on the underside of tracks 109, 110 by a conventional support bearing means (not shown). Sprocket 117 is supported at a point spaced outwardly relative to the heating oven exit.

An upwardly directed channel-shaped guide track 122 is supported within heating chamber 81 in a horizontal relationship, parallel to and in substantially a common plane with the transfer tracks 109, 110. Guide track 122 supports the upper run 123 of endless chain 101 for movement through heating chamber 81. The lower run 124 of endless chain 101 is supported by a downwardly directed channel-shaped guide track 123 mounted on the heating oven support framework 52 in parallel vertically spaced alignment with channel guide track 122.

As shown in FIGS. 3, the endless chain 101 is driven for transfer movement from left to right through the heating chamber 81 by a conventional driving sprocket (not shown) which is fixed to motor drive means 126. Drive from motor 126 is delivered to sprocket 117 by a conventional chain drive means 127. Chain 101 is provided with sufficient slack in the lower run 124 whereby the chain lower run will smoothly enter and exit from guide track 125. Control for motor 126 is effected by limit switches 67, 77 which are operatively associated with movement of doors 55, 56, 69 and 70 to an open position and by limit switches 128, 129 operatively associated with transfer conveyor 251. Oven conveyor motor 126 is also provided with a manual control switch 130 and a timed controlled switch 131.

DOLLEY SUPPORT MEANS

Figure 7:
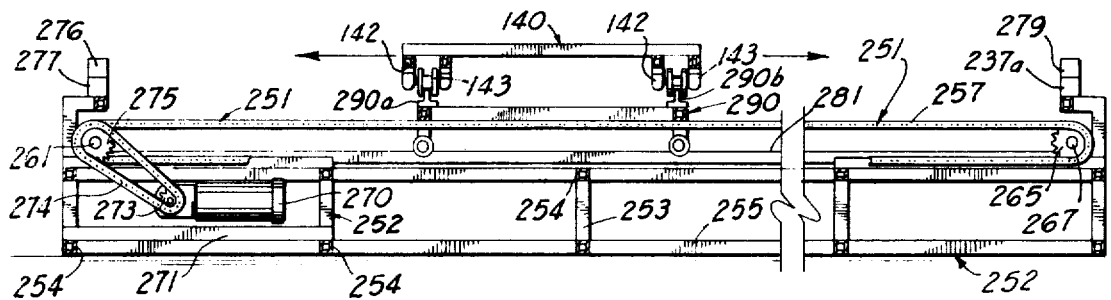
FIG. 7 is a vertical sectional view taken along line 7—7 of FIG. 3.

As shown in FIGS. 3 and 7, a mold with material to be casted is transported through the heating chamber 81 by means of a transport dolley 140. Dolley 140 includes a rectangular substantially flat horizontal supporting surface 141 provided with a whell support bracket 142 adjacent each corner, each of which rotatably supports a pulley-shaped wheel 143. The pulley shaped wheels 143 of the transport support dolley consists of two laterally spaced pairs with the wheels of each pair being supported in fore and aft coplaner relationship. The lateral spaced and pulley shaped design of wheels 143 are detailed such that wheels 143 will operate in a tracked relationship on support tracks 26, 27 of the mold charging station and tracks 109, 110 of the heating chamber 81.

Movement of transport dolley through the heating chamber 81 is effected by lugs 102 carried by the upper run 123 of endless chain 101. As shown in FIG. 3 the lugs 102 will contact a downwardly extending bumper element 144 mounted on an extending edge of a transport dolley tongue element 145. The bottom run 124 of chain 101 is detailed in yieldable degrees to allow the endless chain lug 102 to tilt to a position to allow lugs 102 to pass under the bumper 144 should the transport dolley 140 become blocked while endless chain 101 is in motion or the bumper element 144 to pass over the lug 102 if the chain 101 is stopped when the dolley 140 is placed on the conveyor.

The automatic control means for controlling operation of the closure means 55, 56 heating means 83, and transfer means 100 will be described in more detail hereinbelow in the description of the operation of the heat exchange system.

COOLING APPARATUS

Referring now particularly to FIGS. 1 and 9-11, the cooling apparatus 150 includes a first cooling station 151 and a second cooling station 152. Cooling station 151 is provided with a structural framework including four vertically oriented and horizontally spaced legs 152, 153, 154 and 155. Legs 152-155 are supported in parallel relationship by a number of horizontal connector elements 156. A cooling operation is performed within the cooling station 151 by means of four air circulating fan means 157, 158, 159 and 160. Each of the fans 157-160 includes a conventional motor drive means 161 which is operatively connected for driving a rotor blade element 162 and operating through a manual controlled switch 175. The fan rotor blade elements 162 are of conventional construction and detailed to direct air currents onto a mold means located within cooling station 151. Each of the fan elements 157-160 includes conventional wire mesh shield means 163 provided thereabout for enclosing the fans to prevent injury or unwanted contact of objects with the fan blade elements 162.

Figure 9:
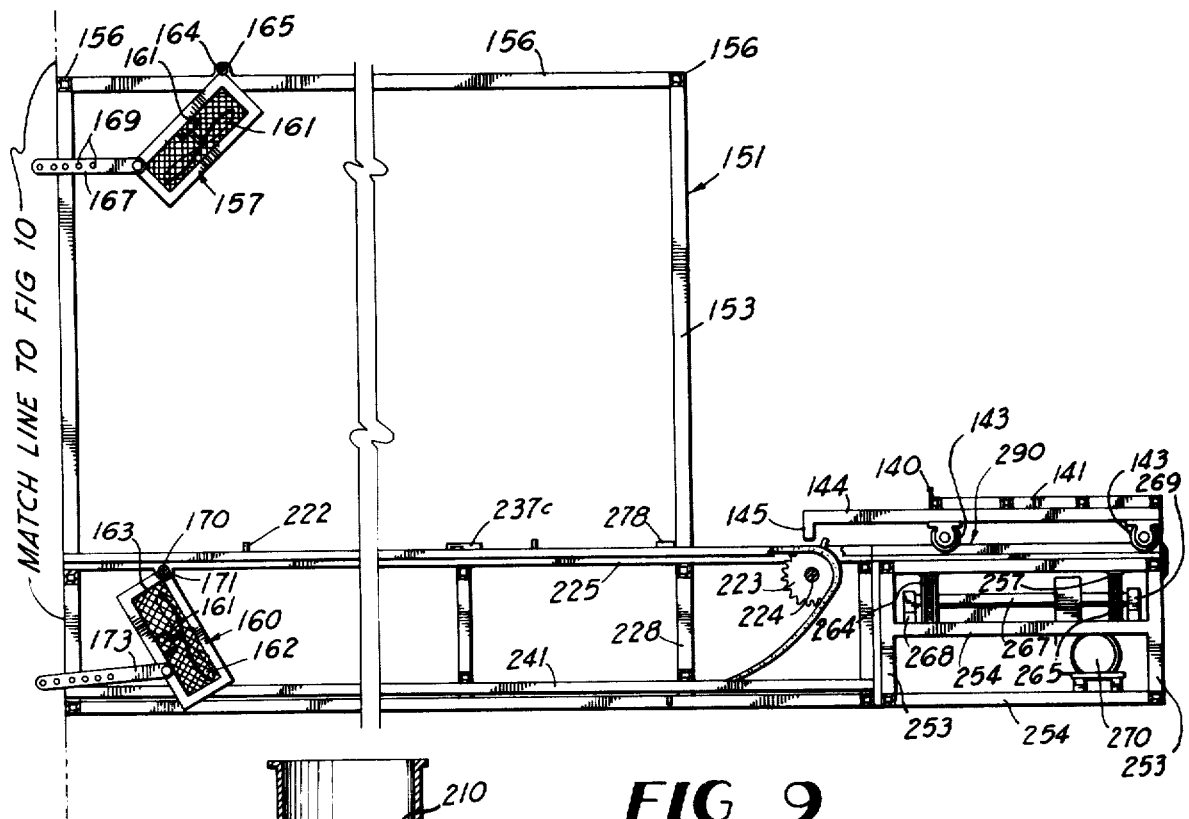
FIGS. 9-11 are vertical sectional views which are connectible along matched lines indicated thereon and illustrating a vertical sectional view taken substantially longitudinally through the cooling stations.

As shown in FIGS. 1 and 9, the fan elements 157, 158 are supported by means of a horizontal supporting shaft 164. Shaft 164 is fixed to fan elements 157, 158 by conventional means such as welding (not shown). Shaft 164 is supported for angular movement within a pair of bearing elements 165, 166, which are fixed to an upper surface of horizontal connector beams 156. Fan elements 157, 158 are adjustable about the axis of shaft 164 by means of a pair of elongated link elements 167, 168. Links 167, 168 are connected adjacent one end to a lower edge of fans 157, 158, respectively. Links 167, 168 include a number of spaced openings 169 which are selectively connectable with conventional connecting bolt means (not shown) to support the fan elements 157, 158 in a desired angular adjusted position. In operation, the fans 157, 158 are supported and adjusted to direct air downwardly onto a heated mold positioned within heating station 151.

Referring now particularly to FIGS. 1 and 3, the fan elements 159, 160 are supported by a horizontal cross support shaft 170 which is fixed by conventional means such as welding to the housing structure of fans 159, 160. Shaft 170 is supported for angular movement within a pair of bearing members 171, only one of which has been illustrated in FIG. 9. The bearing elements 171 are fixed to an underside of cooling station track means which will be described in more detail hereinbelow.

A lower depending portion of fan housing 159, 160 is provided with a pair of elongated link members 172, 173. Links 172, 173 include a number of spaced openings, with one opening being connected to the fan housing 159, 160 and with a second spaced and selected opening being connected to the vertical leg members 152, 153. The elongated links 172, 173 are connected by conventional connecting means (not shown) to the legs whereby the fan can be angularly adjusted about the axis of support shaft 170. Fans 159, 160 are detailed in operation for directing air currents upwardly to an underside of the mold means.

Operation of fans 157–160 is effected by means of a manual control switch 175 which is moved to an on position prior to the start of an automatic cycle of operation of the mold conveying and transfer means.

Figure 10:
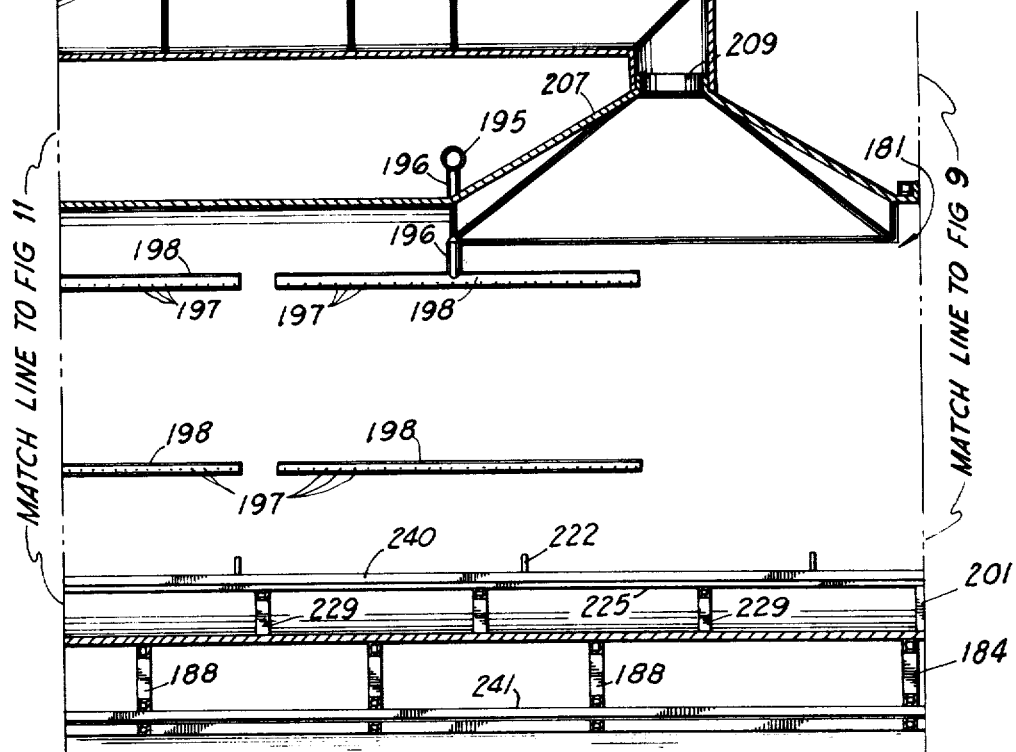
Figure 11:
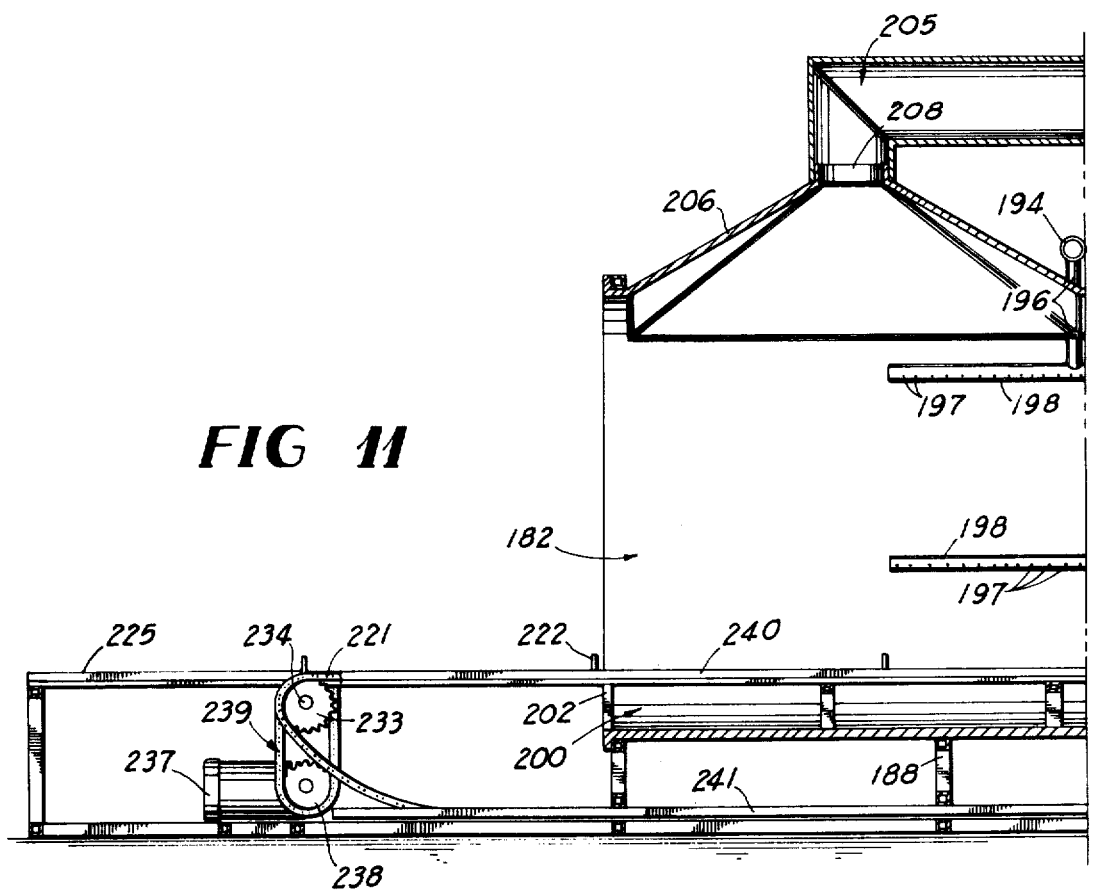

As shown in FIG. 1 the second cooling station 152 is provided with an elongated cylindrical shaped cooling chamber 180. Cooling chamber 180 is provided with an entrance opening 181 as shown in FIG. 10 and an exit opening 182, as shown in FIGS. 1 and 11. Cooling chamber 180 is supported in a horizontal plane by a supporting framework which includes four vertically oriented post elements 183, 184, 185 and 186. Post 183–186 are supported in spaced parallel relationship and vertically oriented by means of a number of horizontal connector elements 187. As shown in FIGS. 10 and 11, a number of support framework means 188 are detailed in vertical oriented position and horizontally spaced beneath an intermediate portion of cylindrical shaped cooling chamber 180, for supporting an intermediate portion of the cooling chamber. The cooling chamber 180 is fixed to the structural support framework by conventional means such as welding (not shown).

As shown in FIGS. 1, 10 and 11, a cooling operation within cooling chamber 180 is provided by means of a liquid spray means. The liquid spray means includes a high pressure pump means 190 which is driven by conventional pulley and motor drive means 191. Pump 190 is controlled by a manually operable switch 190a which is moved to an on position prior to starting an automatic cycle of operation. Input supply line 192 is connected in fluid flow communication with pump 190 for supplying a required amount of cooling solution to pump 190. Pump 190 includes a high pressure supply line 193 which is connected in fluid flow communication with a branch supply line 193. Opposite ends of the branch supply line 193 is connected in fluid flow communication with a cooling supply manifold 194, 195. Each of the cooling supply manifolds 194, 195 is provided with a number of supply conduits 196 which are connected in fluid flow communication with the manifolds 194, 195 and extend into an interior of cooling chamber 180.

As shown in FIGS. 10 and 11, an extended end of the supply conduits 196 are connected in fluid flow communication with a dispensing conduit means 197. The dispensing conduit means 197 are detailed to be supported by the branch supply lines 196 in longitudinally aligned relationship and parallel to the axis of the cylindrical cooling chamber 180. The dispensing conduits 197 are detailed in orientation within cooling chamber to be located in a circumferentially spaced relationship around the interior portion of cooling chamber 180, such that the cooling liquid dispensed by the dispensing conduits 197 include a number of aperatures 198 located therein whereby a cooling fluid pumped through the supply conduits 195, 196, etc. will be dispensed outwardly of the dispensing conduit 197. The dispensing aperatures 198 are detailed in angular location relative to the axis of the cooling chamber 180 whereby the dispensed cooling liquid is directed along a path substantially in alignment with radial lines extending to the axis of cooling chamber 180.

As shown in FIGS. 1, 10 and 11, the elongated cylindrical cooling chamber 180 includes a sump reservoir means 200. The sump reservoir means 200 is defined by the lower surface portion of cylinder 180 and by means of upwardly directed end walls 201, 202. End walls 201, 202 are provided adjacent the entrance and exit openings 181, 182, respectively. The end walls 201, 202 are detailed in vertical dimensions to provide a predetermined amount of reservoir storage means within cooling chamber 180. The input supply line 192 of pump 190 is connected in fluid flow communication with the sump reservoir 200 by conventional connecting means (not shown) whereby the quantity of cooling liquid contained in the sump reservoir 200 can be pumped through the dispensing conduit means 192, 193, etc.

The sump reservoir means 200 is provided with conventional supply means for introducing a supply of cooling liquid into the reservoir sump 200. The liquid introducing means includes conventional liquid supply lines (not shown) which are connected in fluid flow communication with an automatic control valve means (not shown) for maintaining the liquid level within sump reservoir 200 at a predetermined elevation.

As shown in FIGS. 1, 10, and 11, the cylindrical shaped cooling chamber 180 includes an exhaust system for exhausting the heated air radiated by the heated mold being cooled within the cooling chamber. The air system 205 includes a pair of inverted funnel shaped housings 206, 207. Housings 206, 207 are mounted in flow communication with an upper surface portion of cylinder 180. Each of the exhaust housings 206, 207 includes a discharge spout 208, 209, respectively. Discharge spouts 208, 209 are connected in flow communication with a common exhaust conduit means 210. The common exhaust conduit means 210 includes an exhaust spout means 211 having a conventional power operable exhaust fan 213 located therein and which is in flow communication with an intermediate portion of the exhaust conduit 210. The exhaust spout means 211 is connected to a vent stack 212 which is in flow communication with an exterior area of the building housing the heat exchange system described herein.

The operation of the pump means 190 to effect a cooling operation is controlled by conventional switch means which will be described in more detail hereinbelow in the description of the operation of the system.

Referring now particularly to FIGS. 1, 10 and 11, the cooling stations 151, 152 are provided with a material transfer means 220. Material transfer 220 includes an endless chain type conveyor element 221 supported for operation in a vertical plane and provided with a series of projecting lug elements 222. Endless chain 221 is supported adjacent the entrance of cooling station 151 by a sprocket element 223. Sprocket 223 is rotatably supported by a cross shaft 224 journaled in a pair of conventional bearing support elements (not shown) which are mounted on the underside of a pair of guide track elements 225, 226.

As shown in FIG. 1, tracks 225, 226 are L-shaped and are supported to extend through the elongated cylindrical heating chamber 180 and through the structural framework of heating station 151.

Tracks 225, 226 extend from a position adjacent the entrance end of cooling station 151, as shown in FIGS. 1 and 9, through cooling station 151, through cooling station 152 and extend outwardly beyond the exit opening 182 of cooling chamber 180, a distance to provide a supporting surface for a number of mold dolley support means. Tracks 225, 226 are supported adjacent the entrance end of cooling station 151 by a horizontal connector beam 156 which is provided with additional supporting framework including a pair of vertically spaced leg members 227, 228. Legs 227, 228 are aligned vertically beneath tracks 225, 226, respectively. Tracks 225, 226 are supported within the interior of cylindrical chamber 180 by means of a number of horizontal connector elements 229 which are provided within chamber 180. The connector elements 229 are detailed to support tracks 225, 226 in a position to allow the tracks 225, 226 to extend over the end walls 201, 202. Tracks 225, 226 are supported on an extended end of the cooling station outward of exit opening 182 by means of a number of structural framework elements 230. Structural framework elements 230 are supported in vertical planes and in horizontally spaced locations by means of longitudinal connecting beams 231.

As shown in FIGS. 1 and 11, the endless chain conveyor means 221 is supported in a position spaced outwardly of the exit opening of chamber 180 by means of a sprocket 233. Sprocket 233 is fixed to a cross support shaft 234. Shaft 234 is journaled for rotation within conventional bearing support means 235, 236. Bearings 235, 236 are fixed to an underside of tracks 225, 266, respectively, by conventional means such as connecting bolts (not shown). A driving operation of endless conveyor 221 is provided by means of conventional electrical motor means 237. Motor 237 is controlled by means of a manual control switch 237a, by a limit switch 237b operatively associated with the position of a mold on the transfer conveyor 251 and by limit switch 237c operatively associated with the position of a mold in the cooling station 151. Motor 237 is provided with a driving sprocket means 238 which is connected by a conventional chain and sprocket drive means 239 to the cross support shaft 234, whereby rotary drive movement of sprocket 238 will drive endless chain 221 in a counterclockwise direction, as shown in FIGS. 10 and 11.

Endless chain 221 is supported for movement through the cooling stations 151, 152 by means of an upwardly directed channel-shaped guide track 240. The upwardly directed channel-shaped guide track 240 is supported within the cooling stations 151, 152 in a horizontal plane and in spaced parallel relationship substantially coplanar with the transfer track means 225, 226. Guide track 240 supports the upper run of endless chain 221 for movement through the cooling stations. The lower run of endless chain 221 is supported by a downwardly directed channel-shaped guide track 241 mounted on the cooling station support framework in parallel vertically spaced alignment beneath channel guide track 240. The endless chain 221 is provided with a sufficient amount of slack in the lower run of the chain whereby the lower run will be directed downwardly and smoothly beneath the guide track 240 to prevent the chain elements from engaging extended edges of the guide track 241.

Guide tracks 225, 226 extend outwardly beyond the entrance opening of cooling station 151, as shown in FIG. 9. The extension of guide tracks 225, 226 as shown in FIGS. 9 is detailed to position the mold transfer means in alignment with a mold transverse conveyor means, as will be described in more detail hereinbelow. The position of endless conveyor 221 and supporting sprocket 223 is detailed to effect a transfer of a mold from a transverse conveyor means onto the cooling station conveyor means, as will be described in more detail hereinbelow.

MOLD TRANSFER MEANS

Figure 8:
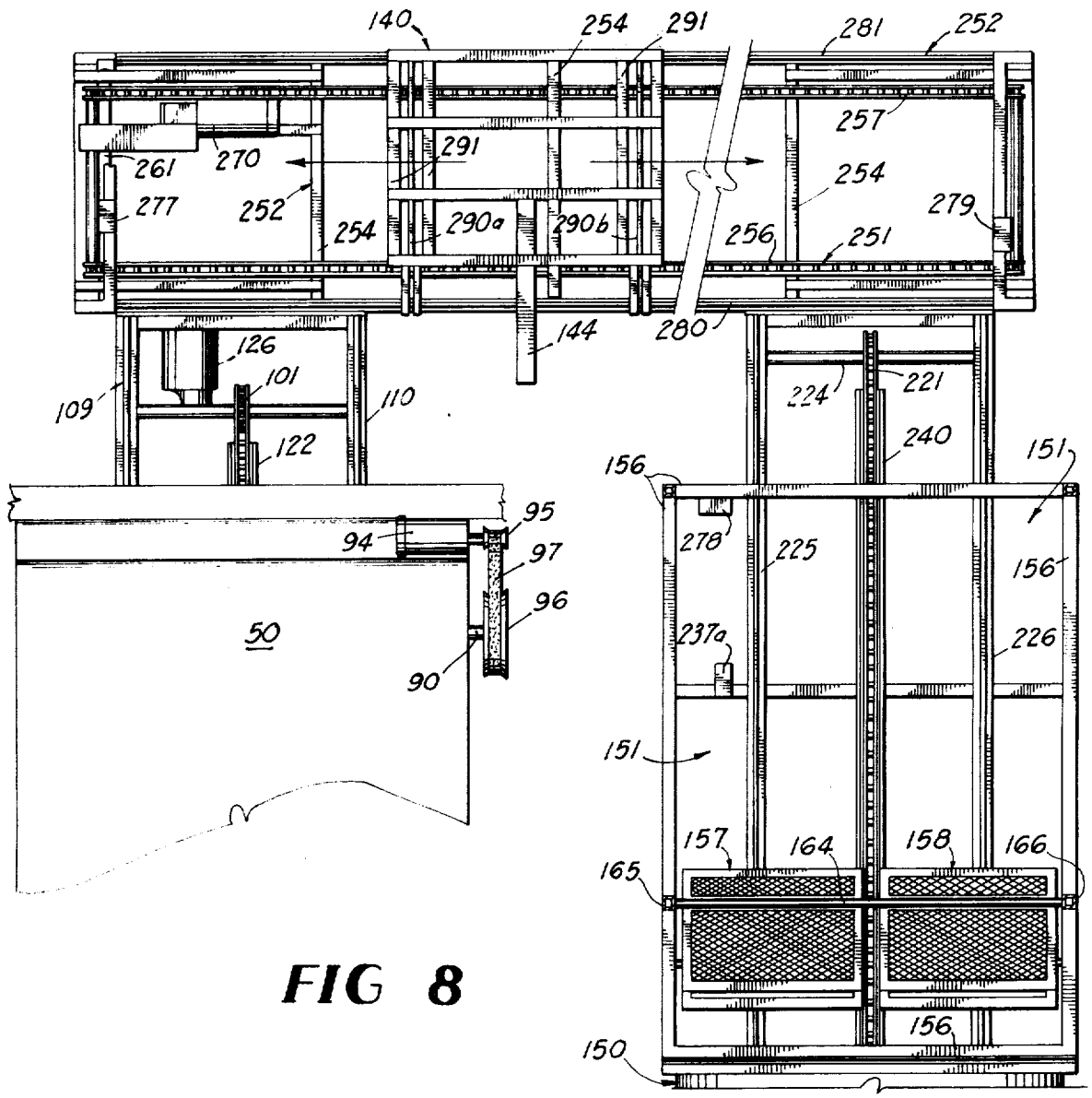
FIG. 8 is an enlarged fragmentary plan view showing the transfer conveyor means operatively associated with a portion of the heating oven conveyor means and the cooling station conveyor means.

Referring now particularly to FIGS. 1, 3 and 7–9, a mold transfer mechanism 250 is shown for effecting movement of a mold from a position adjacent the exit end of heating oven 50 to a position adjacent the entrance end of cooling station 151. As shown in FIG. 8, the extended end of the heating oven mold transfer conveyor means 100 is supported in transverse alignment with an entrance end of the cooling station mold conveyor means 221 and the conveyor means for effecting movement of a mold from the heating oven to the cooling station is supported in alignment with the extended end of heating oven conveyor and entrance end of cooling station conveyor.

The transfer means 250 includes operable conveyor mechanism 251 and a structural support mechanism 252 therefor. The structural support 252 includes a number of vertically oriented leg support members 253, a number of transverse horizontal connector members 254 and a number of longitudinally extending horizontal connector members 255. The structural framework, including members 253, 254, etc., is detailed to provide a base means in abutting contact with a supporting surface. An upper surface of framework 252 includes a generally horizontally oriented support means for supporting the operable conveyor means 251.

The operable conveyor means 251 includes a pair of endless chair drive members 256, 257. Chains 256, 257 are supported in parallel spaced apart relationship for driving movement in vertical planes. Chains 256, 257 are supported adjacent a first end by means of a pair of sprockets 259, 260. Sprockets 259, 260 are fixed in axially spaced relationship to a cross support shaft 261. The cross support shaft 261 is rotatably supported by a pair of bearing support members 262, 263. The bearing support members 262, 263 are mounted on an upper support surface of one of the cross connecting structural framework members 254. A second end of the endless conveyors 256, 257 are supported by means of a pair of sprockets 264, 265. Sprockets 264, 265 are fixed to a cross support shaft 267. Cross support shaft 267 is rotatably supported in a pair of bearing elements 268, 269. Bearings 268, 269 are mounted on an upper surface of a structural frame member 254, as shown in FIG. 9. A driving motion of conveyors 256, 257 is effected by means of a conventional power motor means 270. Motor 270 is supported on a plate element 271 which is in turn supported on a pair of the horizontal connector members 254. Motor 270 includes a conventional gear box and sprocket drive means 273. Driving sprocket 273 is connected by a conventional chain drive means 274 to a drive sprocket 275 which is fixed to cross support shaft 261.

As shown in FIGS. 3 and 7-9, the transfer means includes a pair of track elements 280, 281. Tracks 280, 281 are detailed to provide an upstanding support flange. Tracks 280, 281 are supported on an upper surface of the structural framework 252 in a parallel horizontally spaced relationship with the tracks 280, 281 being supported in a common horizontal plane. As shown in FIGS. 7-9, the transfer means 250 includes a reciprocally movable platform means 290. Platform 290 is provided with a structural framework including a number of transverse connector elements 291 and a number of longitudinal connector elements 292. The connector elements 291, 292 are connected together by conventional means such as welding (not shown) to form a substantially rectangular shaped support platform. As shown in FIGS. 3 and 7, the support platform 290 is provided with a wheel support bracket 293 adjacent each corner, each of which rotatably supports a pulley-shaped wheel 294. The four wheels 294 consists of two laterally spaced pairs with the wheels of each pair being supported in fore and aft coplanar relationship. The lateral spacing and pulley design of wheels 294 are detailed such that the wheels 294 will operate in a tracked relationship on tracks 280, 281.

As shown in FIG. 3, the underside of the movable support platform 290 is connected by conventional bracket connecting elements to the upper run of endless conveyors 256, 257. The upper surface of the movable platform 290 is provided with a pair of parallel arranged and spaced track elements 290a, 290b. The tracks 290a, 290b are supported in detailed spaced relationship such that they can be aligned with the heating oven tracks 109, 110 and tracks 225, 226 of the cooling conveyor means. The vertical dimensions of the structural framework 252 and movable platform 290 is detailed such that the tracks 301, 302 will be supported in a common horizontal plane with the tracks 109, 110 and tracks 225, 226.

The motor drive means 270 is provided with a conventional reversing control means (not shown) whereby the conveyors 256, 257 can be selectively driven in either a clockwise or counterclockwise direction of movement. As shown in FIG. 7, a clockwise direction of movement of endless conveyors 256, 257 will move the support platform 290 to the right and a counterclockwise direction of movement of endless conveyors 256, 257 will move the support platform 290 to the left. Control of the motor 270 for effecting a reciprocating movement of movable platform 290 is effected by a number of limit switches 276-279 which are supported in a detailed position above and adjacent opposite ends of the endless conveyors 256, 257.

As shown in FIGS. 3 and 7-9, and described above the mold dolley 140 includes an elongated tongue element 145 having a bumper bar 144 which is detailed for abutting engagement with the lug elements 102 of the oven conveyor and with the lug elements 222 of the cooling station conveyor. The dimensions of the length of tongue 145 of the mold dolley 140 and the position of the conveyors 101 and 221 are detailed such that a clockwise movement of heating oven conveyor 101 will effect a transfer of the mold dolley 140 onto the tracks 301, 302 of platform 290 when located adjacent a first position and movement of the support platform 290 to a second position on the transverse conveyor means 250 will permit the mold supporting dolley bumper element to be positioned in the path of lugs 222 whereby the mold supporting dolley will be moved along tracks 301, 302 and onto the track 225, 226 of the cooling station. The conveyor system 250 is provided with control switches 276-279 which will effect an automatic operation of the conveyor system 250 and will energize certain other apparatus on the heat exchange and casting system, as will be described in more detail hereinbelow.

OPERATION

To begin operation of the illustrative embodiments of the casting system, the operator closes power switch 301 which is operatively supported on a control panel 300 and operable to connect the blower motor 94 to a 220 volt power source. As shown in FIG. 14, this would also connect the burner control circuit 302, the oven doors and conveyor control circuit 303, the cooling conveyor control circuit 304, the transfer conveyor control circuit 305, the mold charger control circuit 306 and the cooling station control circuit 307 in parallel with each other to the 220 volt source through a conventional step down transformer 308. The blower 88 starts operating to purge chambers 81 and 82 of explosive gases and light 3001 is illuminated to indicate that the various control circuits 302, 307 are operational.

The operator then closes manual switch 83m as seen in FIG. 14 to start the purging operation of burner control circuit 302. This connects a conventional timer mechanism 83TI to the power source through switches 66, 76, 83p and 83k. Switch 66 is located on the entrance closure means and is closed when doors 55, 56 are in their open position. Switch 76 is located on exit closure means and is closed when doors 69, 70 are in their open position. The two switches 83p are conventional pressure actuated switches, with one of the switches 83p being closed when the gas pressure in the supply line 85 is below a certain predetermined value and with the other pressure switch 83p being open when the gas pressure and the supply line 85 rises above a predetermined value. Switch 83t is a normally closed temperature actuated switch and is open when the temperature of the heating chamber 82 exceeds a certain value. Therefore, if the gas pressure in supply line 85 is within a certain range, the blower 88 is operating, the chamber 82 not too hot, and the doors 55, 56, 69 and 70 are open, the timer mechanism 83TI will be activated when switch 83m is closed.

When timer mechanism 83TI is activated, it prevents the supply of gas to nozzle 83 for a predetermined period of time to allow the blower 88 to purge any explosive gases from the chambers 81 and 82. After timer mechanism 83TI has completed its timed delay cycle, a switch mechanism 83s operatively associated with the timer 83TI will transfer a supply of voltage to a conventional flame detector mechanism 83a. Flame detector mechanism 83a determines if there is a flame at the pilot of burner nozzle 83. If the pilot is lit then the flame detector 83a through a conventional circuitry (not shown) activates one of the relay coils 83b to deactivate the timer mechanism 83TI. The control circuitry of the flame detector 83a will aslo operate a relay controlled valve 83v to allow the gas supply line 85 to supply an amount of gas to start the main flame of burner nozzle 83. The main control valve 83v of the gas supply line 85 is of conventional construction and is operatively connected to the pressure control switch means 83p whereby a change in the gas pressure of line 85 above or below a predetermined amount will activate valve 83v to close the supply of gas to burner nozzle 83. The pressure control valve 83v is also operatively associated with the temperature control means 86 whereby a rise in the temperature above a predetermined amount will close the supply of gas to supply line 85.

When the gas supply in line 85 is cut off to the burner nozzle 83, valve 83v cannot be reopened until the purging cycle has been completed. The temperature control means 87 is a thermostatic control switch which regulates the gas flow of burner nozzle 83 to maintain the preselected temperature of the chambers 81 and 82.

While the purging cycle is being completed, the operator has started filling a mold located in position within the mold charging station 10. A mold charging operation is started by closing the manual control switch 40 which will furnish a supply of voltage to a timer control switch 40a. The initial position of timer switch 40a is set to operate a conventional hydraulic control valve which is operatively associated with a solenoid 21a to energize cylinder 21 thereby moving gate 19 to an open position allowing the particles of material contained within the supply hopper 16 to flow through the discharge spout 18 into the cavities of the mold located there below.

After a predetermined amount of particles have been allowed to flow within the mold cavities, the timer control switch 40a will be moved to connect the conventional hydraulic control valve to a second solenoid 21b which will reverse the operation of hydraulic control cyclinder 21 to close gate 19 preventing any further particles to flow within the mold cavities.

When the timer switch 40a is moved to the second position, a supply of voltage will be transferred through a timer switch 42 through a solenoid 31a. Solenoid 31a is operatively associated with a conventional pneumatic control valve (not shown) which will allow operation of the vibrating motors 31, 32. After the vibrating motors 31, 32 have been operated for a predetermined period of time, the timer control switch 42 will be moved to an off position.

Should the supply of material located within the supply hopper 16 drop below a predetermined level, the limit switch 39 will close thereby energizing motor 38. When motor 38 is energized the particle material located within the catch basin 33 will be sucked up through conduit 36 and returned to the supply hopper 16. When the material within supply hopper 16 rises to a predetermined level, the limit control switch 39 will be open thereby stopping suction motor 38.

As shown in FIG. 14, a manual control switch 41 is operatively connected with the solenoid 21a whereby gate 19 can be moved to an open position as desired and can be returned to the closed position by switch 41. The manual control switch 41 is also electrically connected to solenoid 31a whereby the vibrating motors 31, 32 will be energized through the solenoid 31a. After a mold has been completely filled, the mold is moved outward through the mold charging exit 25 onto the outward extended end of tracks 26, 27 whereby the mold can be transferred to the heating oven 50 for an automatic cycle of operation as will be described in more detail herein below. Heating oven 50 is detailed in dimensions to support a number of molds therein during a heat casting operation.

Before an automatic cycle of operation is started, the number of molds which can be contained within the heating station 50 are transferred into the interior of the heating chamber 82 by manual operation of conveyor 100. A manual operation of oven conveyor 100 is effected by closing manual control switch 130. When manual control switch 130 is closed, voltage will be transferred to the conveyor motor 126 to effect a conveying operation thereof provided limit switches 67, 66 and 129 are closed. Limit switch 67 is operatively associated with the doors 55, 56 and is moved to a closed position when doors 55, 56 are in their open position. Limit switch 77 is operatively associated with the doors 69, 70 and is likewise moved to an open position when doors 69 and 70 are in their open position. Limit switch 129 is operatively associated with the mold transfer conveyor 251 and is moved to a closed position when the mold transfer carriage 290 is located in position adjacent the exit end of oven conveyor 100. Provided the limit switches 67, 77 and 129 are closed, closing manual switch 130 will energize motor 126 to manually transfer a mold located adjacent the oven conveyor entrance opening 53 into the interior of the heating chamber 82.

Before beginning an automatic cycle of operation, the cooling station cooling means must be energized. The fan means 156-160 of cooling station 151 is energized by closing manual control switch 175. Movement of manual control switch 175 to a closed position will allow current to flow to each of the fan motors 161 thereby effecting operation of the fans 156–160.

Operation of the liquid cooling station 152 is effected by closing manual control switch 190a. Closing of manual control switch 190a will allow current to flow to the pump 190 to begin the liquid cooling pumping cycle. Initiation of a cooling operation is completed by closing manual control switch 213a to thereby energize the exhaust fan motor 213.

After the cooling station cooling mechanism has been energized as described above and after a predetermined number of molds have been located into the interior of the oven heating chamber 82, an automatic cycle of operation is begun by closing switch 130a which is operatively associated with the oven conveyor 101. Closing of switch 130a will transfer a voltage through switch 128, 130b to a timer control switch 131. The timer switch 131 is normally maintained in a position shown in FIG. 14 which will illuminate light 130l indicating that the automatic cycle of operation is operational. Limit switch 128 is operatively associated with the mold transfer conveyor 215 and is moved to a closed position when the mold transfer carriage 290 is located in position adjacent the exit end of oven conveyor 101. Switch 130b is a cycle reset switch and is normally maintained in a closed position and is operatively associated with the mold transfer means 250 and timer mechanism 130 whereby the automatic cycle of operation will be reset automatically after a first mold has been moved out of the heating chamber 82 onto the mold transfer means 250 and transferred into the cooling stations 151.

As shown in FIG. 14, the motors 58, 72 which operate to open and close doors 55, 56 and 69, 70, respectively, are operatively associated with the automatic cycle of operation of the oven conveyor 101. The motor 58 includes a pair of limit switches 64, 65, with one limit switch 64 being located to indicate the doors are closed to stop the operation of the motor 58 and limit switch 65 is operatively associated with the open limit position of doors 55, 56 to stop motors 58. Motor 72 has a pair of limit stop switches 74, 75, with limit switch 74 operatively associated with the close limit position and switch 75 operatively associated with the open limit position. As described herein above, the doors 55, 56, 69 and 70 also are operatively associated with limit switches 67, 77, respectively which will prevent the operation of the conveyor motor 126 unless the doors 55, 56 69 and 70 are in their open position, which would effect a closure of switches 66, 77.

After a mold has been located within the heating oven a predetermined period of time, sufficient to allow the flowable material contained in the mold to unite to form the shape of the predetermined object, the time control switch 131 will be moved to a second position energizing the door motors 58, 72. Energization of door motors 58, 72 will move their associated doors to an open position to close limit switches 67, 77. With the switches 67, 77 closed and with the mold transfer carriage 290 located in position to close switch 129, a mold will be transferred by conveyor 101 onto the mold transfer carriage 290. Movement of a mold onto the mold transfer carriage 209 will close limit switch 276. When limit switch 276 is closed, a current will be allowed to flow through closed limit switch 279 through a conventional solenoid operated reversing mechanism for driving motor 270 in a clockwise direction, as shown in FIG. 7. A clockwise direction of movement of the conveyor 251 will transfer the mold support dolley 140 and mold carriage 290 to the right to a right limit position, located adjacent the entrance of cooling station conveyor 221.

When the mold carriage 290 is moved to a right limit position, switch 279 will be opened thereby stopping operation of motor 270. With the carriage 290 and transfer dolley 240 in a right limit position, limit switch 237a operatively associated with the cooling station conveyor motor 237 will be closed to thereby effect operation of the cooling conveyor 221. Operation of the cooling conveyor 221 will carry the mold support dolley 140 into cooling station 151 which will activate the switch 237b thereby stopping the cooling station conveyor in a correct position within cooling station 151 for a cooling operation.

When the mold support dolley 140 is in the correct position within the cooling station 151, a limit switch 278 will be closed thereby effecting operation of a reversing means to drive the conveyor 251 in a counterclockwise direction. Movement of a conveyor 251 in a counterclockwise direction, as shown in FIG. 7, will return the carriage 290 to a leftward limit position. Movement of transfer carriage 290 to a leftward limit position will contact and open limit switch 277 thereby stopping operation of conveyor drive motor 270. When the transfer carriage 290 has returned to the leftward limit position, the cycle reset switch 130b will be closed thereby resetting the timer switch 131 for a second automatic cycle of operation.

The automatic cycle of operation of the heat casting system is controlled by the timer mechanism 131t operatively associated with the oven conveyor means and by the limit switches associated with the transfer conveyor means and the cooling station conveyor means whereby the timing cycle for an automatic operation is reset after a first mold has been transferred out of the heating oven 50 and into the first cooling station 151. A number of automatic cycles of operation will effectively transfer a heated mold through the oven heating means, and successively through cooling stations 151, 152 and to a location remote from the cooling station on the extended track support means 225, 226.

The above described automatic cycle of operation has been described to include stopping of a mold in the heating oven for casting and at each of the cooling stations 151, 152 for cooling, with an automatic continuation of the mold from each stopping stage after a predetermined length of time. However, it would be obvious that the length of the heating oven 50 and the length of the cooling zones 151, 152 could be detailed in design such that a timed rate of continued movement could be effected by a mold through the entire system.

From the foregoing operation, it will be seen that the method of invention includes the steps of:
 a. confining a predetermined amount of flowable material in a predetermined shaped area;
 b. moving the confined material through a heating station to melt the material thereby forming the predetermined shaped object;
 c. transferring the heated mold to a cooling station; and
 d. moving the heated mold successively through a number of cooling stations to reduce the temperature of the heated mold below a predetermined temperature to allow the formed object to be removed from the mold.

Step A is performed by charging a predetermined shaped mold in station 10.

Step B is performed by bringing the temperature of heating station 50 to a predetermined temperature and then moving the charged mold into the heating station and allow the mold to remain a predetermined period of time.

Step C is performed by effecting operation of mold transfer to conveyor means 251 to transfer the mold from the heating station to the cooling station.

Step D is performed by moving a heating mold through cooling stations 151 and 152.

Having thus described herein above the component part of the illustrative embodiments of the system and the control circuit therefor, it now becomes evident that the illustrative embodiments of the present invention is capable of carrying out the casting system as outlined in the objects above. It is understood that various modifications of design of the component parts and circuitry therefor will be obvious to those skilled in the art, without departing from the spirit of the invention, which is to be limited only by the scope of the appended claims.

What is claimed is:

1. A system for converting particles of flowable material into objects having a predetermined shape comprising, in combination, a plurality of mold means each defining a cavity area representative of the shape of a predetermined object, individual dollies for respectively carrying said mold means, said dollies each having a horizontal supporting surface for carrying said mold means and wheels on the underside of said surface, means for successively filling the cavity areas of said mold means on said dollies with a predetermined amount of flowable material in the form of particles, an oven having a heating material in the form of particles, an oven having a heating chamber including means for heating said mold means on said dollies to a temperature sufficient to melt said particles, means for transferring said mold means containing said particles and their dollies to said oven heating chamber and for moving them successively and individually therethrough for a time sufficient to melt said particles along a substantially straight line path to a point on a second straight line path extending laterally of said first path, means for moving said mold means and said dollies successively and individually along said second path to a point on a third path extending parallel to said first path, cooling chamber means surrounding said third path, and means for moving said mold means and said dollies successively and individually along said third path and through said cooling chamber means in a direction opposite to their direction of movement along said first path and for a time sufficient to cool said flowable material to a point at which it will solidify, said heating chamber and said cooling chamber being adjacent to and in side-by-side relationship to each other, the means for moving said mold means and said dollies along said first and third paths comprising endless chain members having outward projections and said dollies mold members have portions engageable by said projections and wherein said means for moving said mold means and said dollies along the second path comprises a movable platform for receiving a dolly and a chain member.

2. A system as in claim 1 wherein the chain means for moving the mold means and said dollies along said first path is so arranged that it will deposit said mold means and said dollies successively on said movable platform.

* * * * *